United States Patent [19]

Walker

[11] Patent Number: 4,760,484

[45] Date of Patent: Jul. 26, 1988

[54] PROTECTIVE INDUCTIVE DEVICES WITH INCREASED ABILITY TO ABSORB VOLT-SECONDS IN AN ELECTRICAL CONDUCTOR

[75] Inventor: Charles S. Walker, King County, Wash.

[73] Assignee: Honeywell, Inc., Minneapolis, Minn.

[21] Appl. No.: 943,099

[22] Filed: Dec. 18, 1986

[51] Int. Cl.$^4$ .............................................. H02H 3/20
[52] U.S. Cl. ....................................... 361/18; 361/111; 361/118; 336/175; 336/233
[58] Field of Search ................. 361/58, 111, 18, 117, 361/118, 126, 2, 91; 336/175, 178, 221, 233; 365/58, 60

[56] References Cited

U.S. PATENT DOCUMENTS

| | | | |
|---|---|---|---|
| 2,594,890 | 4/1952 | Ellwood | 361/2 X |
| 2,762,861 | 9/1956 | Somers | 336/175 X |
| 3,303,449 | 2/1967 | Stimler | 336/233 X |
| 3,451,047 | 6/1969 | Gutwin | 336/233 X |
| 3,924,223 | 12/1975 | Whyte et al. | 361/111 X |
| 4,213,082 | 7/1980 | Wisner et al. | 361/18 X |
| 4,434,396 | 2/1984 | Montague | 361/111 X |
| 4,636,163 | 12/1986 | Cooper et al. | 361/118 X |
| 4,656,451 | 4/1987 | Pomponio | 336/175 X |

FOREIGN PATENT DOCUMENTS 247356  11/1969  U.S.S.R. .............................. 365/60

Primary Examiner—G. P. Tolin
Assistant Examiner—A. Jonathan Wysocki
Attorney, Agent, or Firm—C. Lamont Whitham; Michael E. Whitham

[57] ABSTRACT

An inductive device composed of a bead of magnetic material, such as ferrite, has an aperture through which an electrical conductor is adapted to pass. The bead is formed unsymmetrically about at least one axis. The asymmetry of the bead alters the magnetic characteristic of the bead so as to increase its ability to absorb volt-seconds on the conductor and thereby prevent destructively high currents. The inductive device is advantageously used in the d.c. supply to the power transistors of an inverter to protect the transistors from current surges due to the simultaneous conduction of the transistors.

9 Claims, 2 Drawing Sheets

WITHOUT SLOT

WITH SLOT

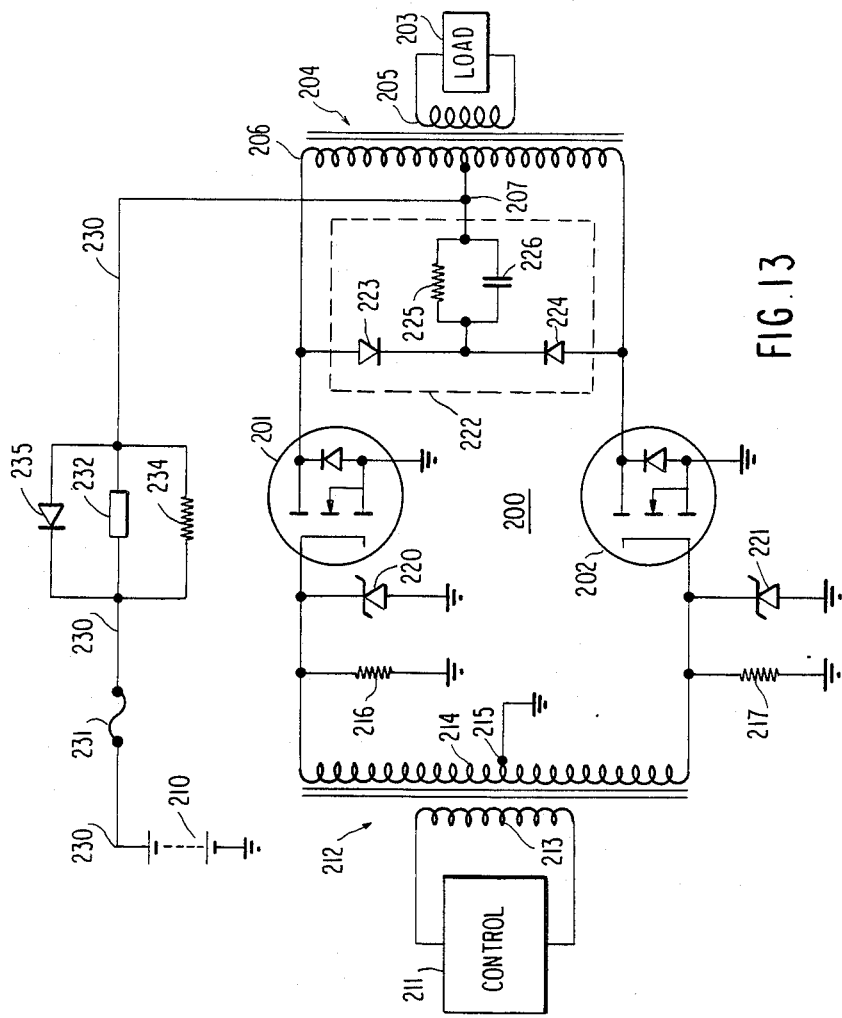
FIG.13
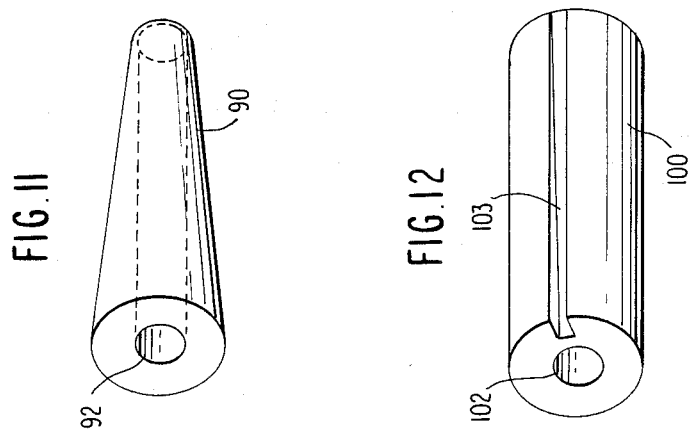
FIG.11
FIG.12

PROTECTIVE INDUCTIVE DEVICES WITH INCREASED ABILITY TO ABSORB VOLT-SECONDS IN AN ELECTRICAL CONDUCTOR

BACKGROUND OF THE INVENTION

1. Field of the Invention

This invention generally relates to the field of electrical engineering and, more particularly, to an arrangement for protecting power transistors from being damaged by inadvertant improper operation of circuitry controlling the transistors.

2. Description of the Prior Art

It is known that if conductors subject to power surges are passed through beads of magnetic material, the beads are capable of absorbing short pulses of energy thereby protecting electrical components connected to the conductors. This principle is taught, for example, in U.S. Pat. No. 2,594,890 to Ellwood issued Apr. 29, 1952. Ellwood discloses ferrite beads strung on a wire for the purpose of protecting electrical contacts from deleterious errosion caused by electrical arcing and/or energy dissipation during contact operation. In the Ellwood circuit, a reed switch is connected in series and controls a relay coil. When the reed switch is closed, a d.c. current flows in the circuit, and when the reed switch is opened, the relay coil inductance produces whatever voltage is necessary to maintain the current flow. This results in an arc being created across the reed switch contacts. In order to protect the reed switch contacts from arcing, Ellwood places three ferrite beads on the conductor between the reed switch and the relay coil. However, the protection afforded by these beads decreases if the material of the beads approaches saturation. In the Ellwood circuit, the d.c. current which flows when the reed switch is closed biases the beads towards saturation, and this is apparently the reason that Ellwood uses three beads to provide the requisite protection for the reed switch contacts.

SUMMARY OF THE INVENTION

It is therefore an object of the subject invention to provide a technique of electrical circuit component protection which minimizes the number of devices used.

It is another and more specific object of the invention to provide a means for protecting circuit components such as power transistors from power surges.

It is a further object of the present invention to employ ferrite beads which are specially shaped or formed to efficiently absorb short pulses of energy.

I have discovered that it is possible to modify the geometry of such beads in a manner which so changes their hysteresis curves that saturation is avoided. More specifically, I increase the volt-second capability of the ferrite bead by adding a slot. The effect of this slot is to modify the hysteresis curve of the bead in such a manner as to reduce the tendency to saturate.

BRIEF DESCRIPTION OF THE DRAWINGS

The foregoing and other objects, aspects and advantages of the invention will be better understood from the following detailed description of the invention with reference to the drawings, in which:

FIGS. 9 to 11 show devices according to the invention which are radially symmetrical about an axis;

FIGS. 12 shows a device according to the invention which is asymmetrical both around and along an axis; and FIG. 13 is a schematic diagram of a circuit illustrative of the use of the devices according to the invention.

DETAILED DESCRIPTION OF THE PREFERRED EMBODIMENTS OF THE INVENTION

Figure 1:
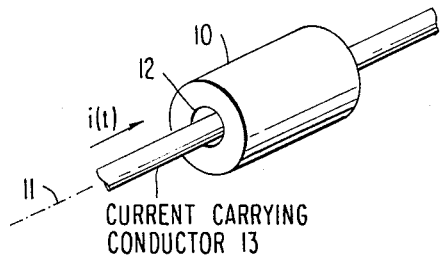
FIG. 1 is a perspective view of a prior art inductive device.
Figure 2:
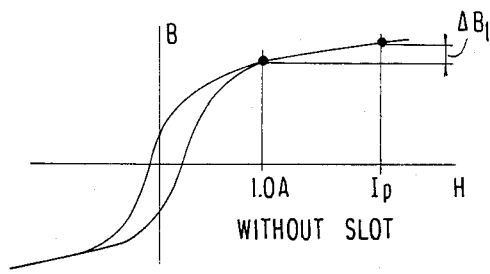
FIG. 2 is a graph of the hysteresis curve of the inductive device shown in FIG. 1.

Referring now to the drawings, and more particularly to FIG. 1, a prior art induction device is shown which comprises a "bead" or generally cylindrical body 10 of magnetically permeable material, such as ferrite. The bead is symmetrical about a central axis 11 and has an axial aperture 12 through which an insulated wire or conductor 13 passes. FIG. 2 is a graph showing a typical hysteresis curve for a ferrite bead of the type shown in FIG. 1. If a positive current i(t) is flowing through the conductor 13 prior to a power surge, the bead may be almost saturated providing little volt-second absorption capability. As shown in FIG. 2, only a flux density change of $\Delta B_1$ is available to absorb volt-seconds. As defined herein, volt-second absorption is directly proportional to $\Delta B$. For example, if a bead has a $15 \times 10^{-6}$ volt-second rating, it is theoretically capable of holding off a 150 volt power supply for 0.1 $\mu$second. By holding off, I mean that the bead allows very little extra current flow. Once the bead saturates, however, the current through the conductor can become destructively large. Thus, in the example shown in FIG. 2, the bead is capable of absorbing little additional volt-seconds because it is biased close to saturation due to the current flowing through it.

According to my invention, the geometry of the bead is altered in order to modify its hysteresis curve. In the specific example shown in FIG. 3, the bead 20 is formed with an axial aperture 22 and a radial slot 23 extending from the surface of the bead through to the aperture 22 along the longitudinal axis of the bead. This slot alters the B-H curve so that it resembles that shown in FIG. 4. As indicated in FIG. 4, the flux density change is increased to $\Delta B_2$, providing additional volt-seconds for absorbing voltage during a power surge. By so altering the magnetic characteristics of the bead, I am able to achieve the same volt-second absorbing capability that would ordinarily require several such beads of the same physical dimensions and material.

Figure 3:
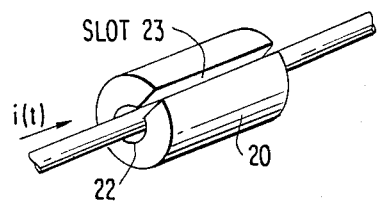
FIG. 3 is a perspective view of one embodiment of the subject invention.
Figure 4:
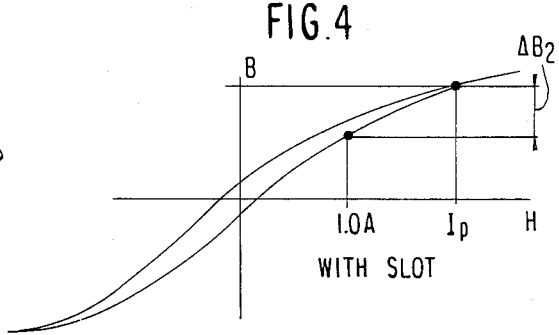
FIG. 4 is a graph of the hysteresis curve of the inductive device shown in FIG. 3.
Figure 5:
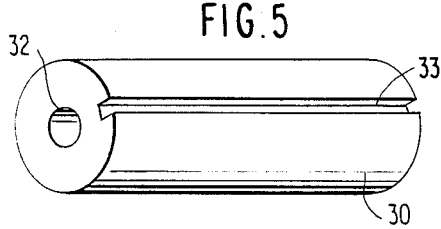
FIGS. 5 to 8 show devices according to the invention which are radially asymmetrical about an axis.
Figure 6:
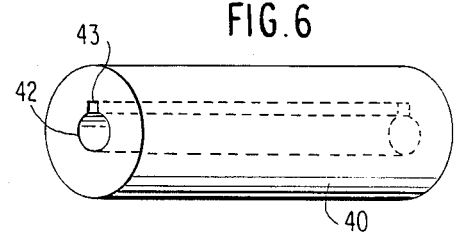
Figure 7:
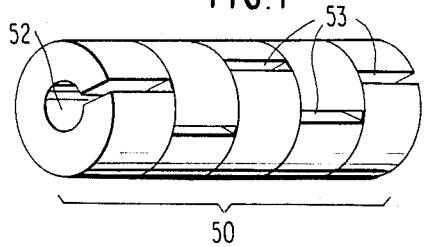

It is evident from FIG. 3 that the slot renders the bead radially asymmetrical. Other embodiments of the invention which are radially asymmetrical are also shown in the drawings. In FIG. 5, a bead 30 having an axial aperture 32 is provided with a groove 33 extending radially inward toward, but stopping short of, the aperture. In FIG. 6, a bead 40 having an axial aperture 42 is provided with a groove 43 extending radially outward toward but stopping short of the surface. FIG. 7 shows that the bead need not be unitary, but may be made up of a plurality of coaxial discs 50 having coaxial apertures such as 52 and individual slots 53 which need not be logitudinally aligned.

Figure 8:
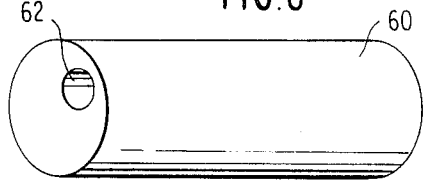

The embodiments of the invention thus far disclosed have all been radially asymmetrical. This characteristic is also shared with the embodiment shown in FIG. 8 where the bead 60 has a longitudinal aperture 62 which is not coaxial with the bead itself, but is eccentric with respect thereto.

Figure 9:
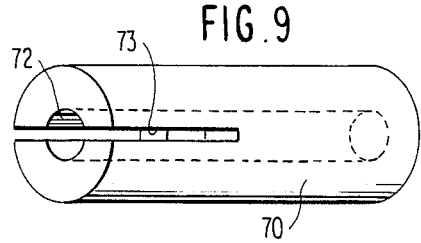
Figure 10:
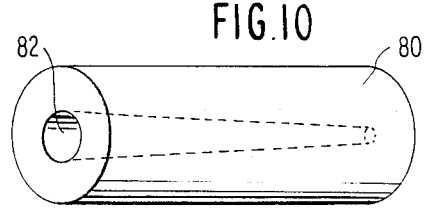

The asymmetry necessary to accomplish the desired modification of the bead characteristics may also be longitudinal. In FIG. 9, there is shown a bead 70 having a central axial aperture 72 but formed with a diametral slot 73 extending for only a portion of the length of the bead. In FIG. 10, there is shown a bead 80 having an axial aperture 82 which is not of uniform diameter but tapers from end to end of the bead. A converse principal is taught in FIG. 11 where a bead 90 has a cylindrical aperture 92 but the bead itself tapers from end to end.

It is of course possible for a bead to be asymmetrical both radially and axially. FIG. 12 shows a cylindrical bead 100 having an axial aperture 102. Along the exterior surface of the bead 100 there extends longitudinally a groove 103 which is of decreasing depth. It will be apparent that the groove could be formed in the interior surface of aperture 102, as in FIG. 6, or that it could vary in width rather than depth, or both width and depth.

While the invention has general application in the field of electrical engineering for protecting electrical components from power surges, it was made to protect the power transistors in miniaturized power inverters. Power surges can occur in these circuits in the event that the power transistors on both sides of the inverter are "on" simultaneously. The use of ferrite beads to provide volt-second absorption in power inverter circuits is known, but as explained with reference to FIGS. 1 and 2, it has been necessary to use several such beads for each transistor to provide adequate protection. As such circuits have become miniaturized, these beads represent a major obstacle to further reductions in size. With my invention, only a single bead is required to provide the protection heretofore afforded by a plurality of such beads.

A circuit in which the beads of my invention are used is shown in FIG. 13. This circuit comprises a conventional inverter or power amplifier 200. A pair of MOSFETs 201 and 202 provide an alternating voltage to a load 203 through a power transformer 204. The transformer 204 has a secondary winding 205, to which the load 203 is connected, and a primary winding 206 having a center tap 207 connected to a direct current source 210. The transistors 201 and 202 are controlled by solid state clock or other control means 211 through a driver transformer 212. The transformer 212 has a primary winding 213, to which the control means 211 is connected, and a secondary winding 214 having a grounded center tap 215. The circuit includes the usual biasing resistors 216 and 217 connected to the gates of power transistors 201 and 202, respectively, as well as over-voltage protection diodes 220 and 221 connected across the gate and source electodes of the power transistors 202, respectively. Additionally, there is provided a snubber circuit 222 connected across the primary winding 206 of power transformer 204 which comprises diodes 223 and 224 having their cathodes connected through the RC circuit composed of resistor 225 and capacitor 226 to the center tap 207.

The d.c. power source 210 is connected to the center tap 207 of the power transformer 204 by a conductor 230. This conductor may be fused as indicated at 231. The conductor 230 passes through a ferrite bead 232 according to the invention. This bead may take any of the forms shown in FIG. 3 or FIGS. 5 to 12, for example. Connected across the bead 232 is a resistor 234 and a diode 235. In the event that both transistors 201 and 202 simultaneously conduct, as when one begins conducting before the other is fully turned off, there is a tendency for a large current surge to be supplied to the sources of the transistors. This current surge, however, is suppressed by the ferrite bead 232 according to the invention. This is illustrated in FIG. 4 which shows that, with one transistor conducting, the bead is biased to the first point indicated on the B-H curve. Because of the altered magnetic characteristics of the ferrite bead, there is still a considerable flux density reserve which is available to absorb volt-seconds and thereby prevent destructively high currents.

While the invention has been described in terms of several preferred embodiments and its application has been described with respect to one specific type of circuit, those skilled in the art will understand that the invention can be practiced with modification and alteration in other and different environments without departing from the scope of the appended claims.

Having thus described my invention, what I claim as new and desire to secure by Letters Patent is as follows:

1. An inverter circuit comprising:
   a pair of power transistors;
   a power transformer having a primary winding and a secondary winding, said primary winding being connected to said power transistors and having a center tap;
   a load connected to said secondary winding;
   a source of d.c. current connected by an electrical conductor to said center tap; and
   a protective inductive device composed of a bead of magnetic material having an aperture through which said electrical conductor passes, said bead being unsymmetrical about at least one axis, the asymmetry of said bead altering the magnetic characteristic thereof and increasing its ablility to absorb volt-seconds on said conductor caused by the simultaneous conduction of said power transistors and thereby prevent destructively high currents.

2. An inverter circuit as recited in claim 1 wherein the asymmetry of the bead is about a radial axis of the bead.

3. An inverter circuit as recited in claim 2 wherein the asymmetry of the bead comprises a slot extending parallel to a longitudinal axis of the bead.

4. An inverter circuit as recited in claim 1 wherein the asymmetry of the bead is along a logitudinal axis of the bead.

5. A protective inductive device as recited in claim 3 in which the slot extends from the surface of the bead inwardly toward the aperture.

6. A protective inductive device as recited in claim 3 wherein the slot extends outwardly from the aperture.

7. A protective inductive device as recited in claim 6 wherein the slot is of nonuniform depth.

8. A protective inductive device as recited in claim 4 in which the asymmetry is a tapered dimension of the aperture.

9. A protective inductive device as recited in claim 4 in which the asymmetry is a tapered dimension of the outside diameter of the bead.

* * * * *

UNITED STATES PATENT AND TRADEMARK OFFICE
CERTIFICATE OF CORRECTION

PATENT NO. : 4,760,484

DATED : July 26, 1988

INVENTOR(S) : Charles S. Walker

It is certified that error appears in the above-identified patent and that said Letters Patent is hereby corrected as shown below:

Column 1, line 6, after the Title, insert --The Government has rights in this invention pursuant to Contract No. N00024-83-C-6254, awarded by the Department of the Navy.--

Signed and Sealed this

Nineteenth Day of March, 1991

Attest:

HARRY F. MANBECK, JR.

*Attesting Officer*  *Commissioner of Patents and Trademarks*